United States Patent
Murphree et al.

(10) Patent No.: US 9,260,935 B2
(45) Date of Patent: Feb. 16, 2016

(54) DEGRADABLE BALLS FOR USE IN SUBTERRANEAN APPLICATIONS

(71) Applicant: Halliburton Energy Services, Inc., Houston, TX (US)

(72) Inventors: Zachary Ryan Murphree, Dallas, TX (US); Michael Linley Fripp, Carrollton, TX (US); Zachary William Walton, Copell, TX (US); Feng Liang, Cypress, TX (US); Dwight Fulton, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 300 days.

(21) Appl. No.: 13/907,336

(22) Filed: May 31, 2013

(65) Prior Publication Data
US 2013/0292123 A1    Nov. 7, 2013

Related U.S. Application Data

(60) Continuation-in-part of application No. 13/252,327, filed on Oct. 4, 2011, and a continuation-in-part of application No. 13/458,335, filed on Apr. 27, 2012, now Pat. No. 8,936,084, which is a division of application No. 12/378,083, filed on Feb. 11, 2009, now Pat. No. 8,757,260.

(51) Int. Cl.
| | |
|---|---|
| *E21B 33/12* | (2006.01) |
| *C09K 8/68* | (2006.01) |
| *C08J 3/20* | (2006.01) |
| *C08J 5/00* | (2006.01) |
| *C08J 7/04* | (2006.01) |
| *C09K 8/03* | (2006.01) |
| *C09K 8/50* | (2006.01) |

(Continued)

(52) U.S. Cl.
CPC .............. *E21B 33/1208* (2013.01); *C08J 3/201* (2013.01); *C08J 5/00* (2013.01); *C08J 7/04* (2013.01); *C09D 167/04* (2013.01); *C09K 8/03* (2013.01); *C09K 8/50* (2013.01); *C09K 8/516* (2013.01); *C09K 8/68* (2013.01); *E21B 33/138* (2013.01); *E21B 34/14* (2013.01); *C08J 2367/04* (2013.01)

(58) Field of Classification Search
None
See application file for complete search history.

(56) References Cited

U.S. PATENT DOCUMENTS

| | | |
|---|---|---|
| 4,420,040 A | 12/1983 | Arbasak et al. |
| 5,253,709 A | 10/1993 | Kendrick et al. |

(Continued)

FOREIGN PATENT DOCUMENTS

| | | |
|---|---|---|
| EP | 1172521 A2 | 1/2002 |
| GB | 2448629 A | 10/2008 |

OTHER PUBLICATIONS

Official Action for Australian Patent Application No. 2010212653 dated Aug. 1, 2013.

(Continued)

*Primary Examiner* — John J Figueroa
(74) *Attorney, Agent, or Firm* — McDermott Will & Emery LLP; John W. Wustenberg

(57) ABSTRACT

Degradable balls for downhole use may include an incompliant degradable polymer and a compliant filler material, the incompliant degradable polymer having an elastic modulus of about 2 GPa or greater, and the compliant filler material having an elastic modulus of less than about 2 GPa. Such degradable balls may be useful in sealing segments of a wellbore and actuating wellbore tools.

16 Claims, 6 Drawing Sheets

(51) Int. Cl.
 *C09K 8/516* (2006.01)
 *C09D 167/04* (2006.01)
 *E21B 33/138* (2006.01)
 *E21B 34/14* (2006.01)

(56) References Cited

U.S. PATENT DOCUMENTS

| | | | |
|---|---|---|---|
| 6,065,540 | A | 5/2000 | Thomeer et al. |
| 6,380,138 | B1 * | 4/2002 | Ischy .................... E21B 33/138 166/283 |
| 7,093,664 | B2 * | 8/2006 | Todd ........................ E21B 33/12 166/317 |
| 7,204,316 | B2 * | 4/2007 | Dusterhoft ............ E21B 43/084 166/207 |
| 7,360,593 | B2 | 4/2008 | Constien |
| 7,503,392 | B2 | 3/2009 | King et al. |
| 7,527,103 | B2 | 5/2009 | Huang et al. |
| 7,595,281 | B2 * | 9/2009 | McDaniel ................ C09K 8/68 166/306 |
| 7,625,846 | B2 | 12/2009 | Cooke, Jr. |
| 7,786,051 | B2 | 8/2010 | Lange et al. |
| 8,109,335 | B2 | 2/2012 | Luo et al. |
| 8,757,260 | B2 | 6/2014 | Luo et al. |
| 8,936,084 | B2 | 1/2015 | Luo et al. |
| 2004/0231845 | A1 | 11/2004 | Cooke |
| 2004/0261995 | A1 | 12/2004 | Nguyen et al. |
| 2005/0205265 | A1 | 9/2005 | Todd et al. |
| 2006/0276345 | A1 | 12/2006 | Todd et al. |
| 2007/0169935 | A1 * | 7/2007 | Akbar ................... E21B 33/138 166/284 |
| 2008/0093073 | A1 | 4/2008 | Bustos et al. |
| 2010/0200235 | A1 | 8/2010 | Luo et al. |
| 2010/0300688 | A1 | 12/2010 | Panga et al. |
| 2011/0132621 | A1 | 6/2011 | Agrawal et al. |
| 2012/0214715 | A1 | 8/2012 | Luo et al. |
| 2013/0062063 | A1 | 3/2013 | Baihly et al. |
| 2013/0081801 | A1 | 4/2013 | Liang et al. |
| 2013/0081821 | A1 | 4/2013 | Liang et al. |

OTHER PUBLICATIONS

Molnar, K., Factors Affecting the Properties of PLA/CaSO4 Composites: Homogeneity and Interactions, Express Polymer Letters, vol. 3, No. 1, Dec. 2008, pp. 49-61, XP055045125.

International Preliminary Report on Patentability for PCT/US2012/056335 dated Apr. 17, 2014.

International Search Report and Written Opinion for PCT/US2014/038739 dated Sep. 17, 2014.

Ultrafine Rubber Particles Raise Thermoplastic's Glass Transition Temperature, Society of Plastics Engineers Plastics Research Online—10.2417/spepro.004492, 2012.

* cited by examiner

DEGRADABLE BALLS FOR USE IN SUBTERRANEAN APPLICATIONS

CROSS-REFERENCE TO RELATED APPLICATIONS

The present application claims priority to U.S. Patent Application Publication No. 2013/0081821 filed on Oct. 4, 2011, and U.S. Patent Application Publication No. 2012/0214715 filed on Apr. 27, 2012, which is a divisional of U.S. Patent Application Publication No. 2010/0200235 filed on Feb. 11, 2009, the entire disclosures of which are incorporated herein by reference.

BACKGROUND

The embodiments disclosed herein relate to degradable balls, methods for their manufacture and methods for use in temporarily sealing perforations in wellbores, isolating segments of wellbores, and actuating wellbore tools.

Ball sealers are typically solid materials useful in sealing portions of a wellbore, subterranean formation, or both during completion operations. For example, ball sealers (sometimes referred to as perforation balls) may be used to seal a perforation in a wellbore to at least substantially reduce flow therethrough into the subterranean formation. In another example, ball sealers may be used in conjunction with a baffle disposed along and within the wellbore to at least substantially reduce flow through the baffle, thereby defining upper and lower segments of the wellbore.

Commercially available ball sealers are typically spherical with a hard, solid core made from nylon, phenolic, or aluminum. The solid cores may be covered with rubber to protect them from solvents and to enhance their sealing capabilities.

After the ball sealer has served its purpose, the ball sealer should be removed from the sealing location so as to return fluid flow between to the portion of the wellbore and/or formation that was previously blocked by the sealer. Typically, the density of the ball sealer is used to achieve removal. That is, ball sealers with a density greater than the fluids disposed within the wellbore (sometimes referred to as "sinkers") may sink and accumulate at the bottom of the wellbore where they are out of the way of further operations. However, bottom hole accumulation can inhibit further wellbore operations. In other instances, ball sealers with a density less than the fluids disposed within the wellbore (sometimes referred to as "floaters") may be flowed back to the surface and potentially reused. In either instance, this clean-up activity may be undesirable as it can delay further operations at the well and adds complications to the well treatment process. It is desirable to avoid either of these processes and would be desirable for the ball sealers to degrade downhole in such a manner as to not form undesirable products that may negatively affect any subsequent operations. More particularly, it is desirable that such balls degrade in a predictable manner, typically within a few hours or days.

Commercially available degradable ball sealers also suffer from a limited useful temperature range. For lower temperature applications, the degradable sealers are generally made from polyvinyl alcohol ("PVA") and/or polyvinyl acetate ("PVAC"). For higher temperature applications, balls may be made from blends of polyethylene oxide ("PEO"), poly(propylene oxide) ("PPO"), and polylactic acid ("PLA") (also referred to as polylactide). However, degradable ball sealers made from any of these materials may soften and deform in use, thereby losing their sealing capability. As such, a need exists for degradable ball sealers that exhibit the necessary rigidity when subjected to wellbore conditions to maintain sealing for the desired time interval, but that can degrade once the need for sealing has passed.

SUMMARY OF THE INVENTION

The embodiments disclosed herein relate to degradable balls, methods for their manufacture and methods for use in temporarily sealing perforations in wellbores, isolating segments of wellbores, and actuating wellbore tools.

One embodiment of the present invention provides for a degradable ball for downhole use, the degradable ball including an incompliant degradable polymer and a compliant filler material, the incompliant degradable polymer having an elastic modulus of about 2 GPa or greater, and the compliant filler material having an elastic modulus of less than about 2 GPa.

Another embodiment of the present invention provides for a degradable ball for downhole use, the degradable ball including a core and at least one shell disposed about the core, wherein the core includes a first incompliant degradable polymer having an elastic modulus of about 2 GPa or greater; and wherein the shell includes at least one selected from the group consisting of a degradable compliant polymer; a second incompliant degradable polymer and a compliant filler; a second incompliant degradable polymer and a degradable compliant polymer; and any combination thereof, the compliant filler material and the degradable compliant polymer each having an elastic modulus of less than about 2 GPa, and the second and third incompliant degradable polymers each having an elastic modulus of about 2 GPa or greater.

Yet another embodiment of the present invention provides for a method that involves introducing a degradable ball according to either of the preceding embodiments into a wellbore penetrating a subterranean formation; seating the degradable ball in a baffle arranged within the wellbore, and thereby reducing a fluid flow through the baffle and defining an upper segment of the wellbore and a lower segment of the wellbore; treating the upper segment of the wellbore; and degrading the degradable ball and thereby returning fluid connectivity between the upper segment of the wellbore and the lower segment of the wellbore.

Another embodiment of the present invention provides for a method that involves introducing a degradable ball according to either of the preceding embodiments into a wellbore penetrating a subterranean formation and having a wellbore tool arranged therein, wherein the wellbore tool is configured to receive the degradable ball; seating the degradable ball on the wellbore tool and thereby reducing the fluid flow through at least a portion of the wellbore tool; applying a differential pressure across the degradable ball seated on the wellbore tool and thereby actuating the wellbore tool; and degrading the degradable ball.

The features and advantages described herein will be readily apparent to those skilled in the art upon a reading of the description of the preferred embodiments that follows.

BRIEF DESCRIPTION OF THE DRAWINGS

The following figures are included to illustrate certain aspects described herein, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
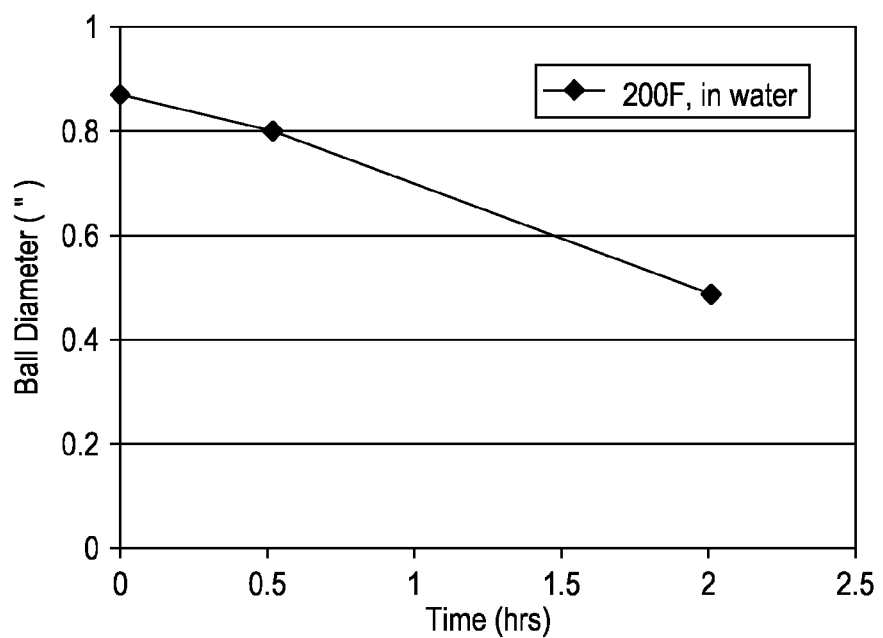
FIG. 1 relates to the dissolution of a ⅞ inches (about 2.22 cm) ball made of sebacic acid.

The embodiments disclosed herein relate to degradable balls, methods for their manufacture and methods for use in temporarily sealing perforations in wellbores, isolating segments of wellbores, and actuating wellbore tools.

In the oil and gas industry, the majority of wells have been completed at depths less than 15,000 feet (4573 meters) and, as a result, most commercially available ball sealers are not designed to perform at temperatures and at pressures commonly associated with wells of that depth or greater. In recent years, technological developments have enabled well operators to drill and complete wells at depths exceeding 15,000 feet (4573 meters), at these higher depths the bottom hole temperature and pressure is often higher, sometimes much higher. In addition to the high temperatures and pressures, wells completed at these depths often produce fluids like carbon dioxide ($CO_2$) or hydrogen sulfide ($H_2S$), and the treatment fluids used may include solvents like hydrochloric acid (HCl). Thus, conducting a wellbore operation using ball sealers in deep, hostile environment wells requires ball sealers capable of withstanding high pressures and temperatures while exposed to gases and solvents. The ball sealers must also resist changes in density to ensure satisfactory sealing efficiency during a wellbore operation.

Of the many potential advantages described herein, is the fact that these degradable balls may be used in subterranean applications involving temperature ranges of up to 250° F. (121° C.) or more, depending on the particular composition employed. Some of the disclosed materials have higher melting temperatures and may be used in even higher temperature applications, for example, up to 400° F. (204° C.) or more. As will be appreciated, the temperature limitations of the system may depend on the melting points of the degradable material forming the degradable balls described herein. Additionally, these degradable balls may exhibit sufficient strength at these temperature ranges to withstand the differential pressures present in the wellbore (e.g., about 500 psi (3447 kPa) to about 3,000 psi (20684 kPa)) during a typical wellbore operation (e.g., fracturing operations, actuating a wellbore tool, etc.). Moreover, upon degradation, the degradable balls described herein, in some instances, should not leave an undesirable residue in the formation that could reduce the permeability of the formation.

The term "carrier fluid" as used herein refers to oil or water based fluids. The term also encompasses carrier fluids that are comprised of gases such as carbon dioxide or nitrogen in large or small concentrations. Such fluids may be used to transport materials, such as degradable balls or proppant particulates, downhole.

In embodiments described and disclosed herein, the use of the term "introducing" includes pumping, injecting, pouring, releasing, displacing, spotting, circulating, or otherwise placing a fluid or material within a well, wellbore, or subterranean formation using any suitable manner known in the art.

The term "degradable," as used herein when referencing the degradable balls described herein, means that a degradable ball is degradable due to, inter alia, both the two relatively extreme cases of hydrolytic degradation that the degradable material may undergo (i.e., heterogeneous (or bulk erosion) and homogeneous (or surface erosion)) and any stage of degradation in between these two. In some instances, the terms "degradation" or "degradable" refer to the conversion of materials into smaller components, intermediates, or end products by the result of solubilization, hydrolytic degradation, biologically formed entities (e.g., bacteria or enzymes), chemical reactions, thermal reactions, reactions induced by radiation, or any other suitable mechanism.

As used herein, the term "incompliant" refers to materials having an elastic modulus of about 2 GPa or greater. As used herein, the elastic modulus of a polymer may be measured by ASTM D638-10.

As used herein, the term "compliant" refers to materials having an elastic modulus of less than about 2 GPa.

The term "diverting agent", as used herein, means and refers generally to an agent that functions to prevent, either temporarily or permanently, the flow of a fluid into a particular location, usually located in a subterranean formation, wherein the agent serves to seal the location and thereby cause the fluid to flow to a different location.

As used herein, the term "treatment," or "treating," refers to any wellbore or subterranean operation performed in conjunction with a desired function and/or for a desired purpose. It should be noted, however, that the term "treatment," or "treating," does not imply any particular action.

As used herein, the term "treatment fluid" refers generally to any fluid that may be used in a subterranean application in conjunction with a desired function and/or for a desired purpose. It should be noted, however, that the term "treatment fluid" does not imply any particular action by the fluid or any component thereof.

The term "stimulation," as used herein, refers to productivity improvement or restoration operations on a well as a result of a hydraulic fracturing, acid fracturing, matrix acidizing, sand treatment, or other type of treatment intended to increase and/or maximize the well's production rate or its longevity, often by creating highly conductive reservoir flow paths.

The term "soluble," as used herein, means capable of being at least partially dissolved upon exposure to a suitable solvent, such as wellbore fluids, at subterranean formation conditions.

The term "deformable," as used herein, means capable of being deformed or put out of shape. For example, a ball may be deformed when its shape is no longer spherical, such as when it deforms to assume the shape of a perforation opening or a baffle (i.e., a ball seat). The deformation can be due at least in part to the differential pressure experienced by the degradable ball between the wellbore and the formation or between segments of a wellbore. It is an indication that the ball shape is flexible.

The terms "substantially plug" and "seal," as used herein, mean to occlude (i.e. seal or plug) an opening by about 95% or more. In some instances, this can be estimated in a lab environment by placing a ball sealer in a temperature controlled pressure chamber against an opening representing a perforation tunnel, ball seat, or the like and applying a flow rate, then measuring the differential pressure held by the ball as it seals against the opening and stops flow. Or by running the test and testing the difference between the unsealed flow and the sealed flow in the case of less than 100% occlusion. Also, visual tests in a lab environment can be used to estimate that no fluid, or only a small amount of fluid, flows through a perforation, ball seat, or the like.

While compositions and methods are described in terms of "comprising" various components or steps, the compositions and methods can also "consist essentially of" or "consist of" the various components and steps. When "comprising" is used in a claim, it is to be understood as an open-ended term.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claim, each numerical parameter should at least be construed in light of the number of reported significant digits and by applying ordinary rounding techniques. Further, when "about" is provided herein at the beginning of a numerical list, "about" modifies each number of the numerical list. It should be noted that in some numerical listings of ranges, some lower limits listed may be greater than some upper limits listed. One skilled in the art will recognize that the selected subset will require the selection of an upper limit in excess of the selected lower limit.

One or more illustrative embodiments incorporating the invention disclosed herein are presented below. Not all features of an actual implementation are described or shown in this application for the sake of clarity. It is understood that in the development of an actual embodiment incorporating the present invention, numerous implementation-specific decisions must be made to achieve the developer's goals, such as compliance with system-related, business-related, government-related and other constraints, which vary by implementation and from time to time. While a developer's efforts might be complex and time-consuming, such efforts would be, nevertheless, a routine undertaking for those of ordinary skill in the art having benefit of this disclosure.

The degradable balls described herein should be able to withstand the impact force experienced when seating the ball and withstand the pressure differentials subsequently applied while still comprising materials that allow for degradation of the ball. The degradation product produced may include molecule, compounds, or particulates that are small enough to travel back to the surface without significantly interacting with or plugging portions of the subterranean formation or wellbore. For example, a degradable ball may comprise compliant filler materials (e.g., rubber particulates) dispersed in an incompliant degradable polymer (e.g., like poly(glycolic acid) ("PGA"), also referred to as polyglycolide) and yield degradation products that include the compliant filler materials and degraded PGA. In such an example, the PGA may provide for degradation and the strength needed to withstand the applied pressure differentials, and the compliant filler material may mitigate breaking or cracking of the degradable ball during seating.

In some embodiments, the degradable balls described herein may comprise an incompliant degradable polymer and a compliant filler material. In some embodiments, the degradable balls described herein may comprise an incompliant degradable polymer and a compliant degradable polymer. In some embodiments, the degradable balls described herein may comprise an incompliant degradable polymer, a compliant filler material, and a compliant degradable polymer.

As used herein, the term "polymer" encompasses homopolymer and copolymers, which may be linear or branched. As used herein, the term "copolymer" encompasses polymers with two or more different monomeric units arranged as random copolymers, block copolymers, graft copolymers, star- or hyper-branched copolymers, and the like.

Suitable examples of incompliant degradable polymers may include, but are not limited to, PGA, crystalline PLA, semi-crystalline PLA having an elastic modulus of about 2 GPa or greater, polyhydroxyalkonates with an elastic modulus greater than about 2 GPa or greater (e.g., poly-hydroxybutyrates), aliphatic polyesters with an elastic modulus greater of about 2 GPa or greater, poly(etheresters) with an elastic modulus greater of about 2 GPa or greater, polyamides with an elastic modulus greater of about 2 GPa or greater, polycarbonates, aliphatic polycarbonates, polyorthoesters, polyethylene terephthalate, and the like, copolymers thereof, blends thereof. For example, poly(lactide)-co-poly(glycolide) copolymers (PLA/PGA) may be suitable for use as an incompliant degradable polymer. One of ordinary skill in the art, with the benefit of this disclosure, should recognize that the elastic modulus of a polymer may depend on, inter alia, the crystallinity of the polymer, the molecular weight of the polymer, derivatization of the polymer, degree of branching of the polymer, and the like.

Suitable examples of compliant filler materials may include, but are not limited to, vulcanized rubber particles, rubber fibers, thermoplastic particles, thermoplastic fibers, hollow glass spheres, hollow ceramic spheres, hollow metal spheres, hollow thermoplastic spheres, particles comprising the compliant degradable polymers described herein, and the like, and any combination thereof. Examples of compliant thermoplastic materials suitable for particulates or fibers may include, but are not limited to, low-density polyethlyene, high density polyethylene, polypropylene, polyethlyene oxide, polypropylene oxide, polytetrafluoroethylene, and the like.

In some instances, the surface of the compliant filler materials may be modified, which may enhance compatibility with and incorporation into the incompliant degradable polymer. Examples of surface modifications may include, but are not limited to, surface oxidation, surface functionalization with moieties miscible with the incompliant degradable polymer, surface functionalization with oligomers of the incompliant degradable polymer, and the like, and any combination thereof. For example, hollow glass beads may be functionalized with silane compounds (e.g., trialkoxysilane, thiols, and the like) compatible with the incompliant degradable polymer (e.g., silane-based polyethylene glycol).

Compliant particles may be included in the degradable balls in an amount ranging from a lower limit of about 0.5%, 1%, 5%, or 10% by weight of the degradable balls to an upper limit of about 50%, 40%, 30%, 20%, or 10% by weight of the degradable balls, and wherein the amount may range from any lower limit to any upper limit and encompasses any subset therebetween.

In some instances, the compliant particles may have an average diameter ranging from a lower limit of about 50 nm, 100 nm, 250 nm, 500 nm, 1 micron, 10 microns, 50 microns, or 100 microns to an upper limit of about 5 mm, 2.5 mm, 1 mm, 500 microns, 250 microns, 100 microns, 50 microns, 10 microns, 1 micron, or 500 nm, and wherein the average diameter may range from any lower limit to any upper limit and encompasses any subset therebetween.

Suitable examples of compliant degradable polymers may include, but are not limited to, polysaccharides (e.g., dextran or cellulose), chitin, chitosan, proteins, aliphatic polyesters having an elastic modulus of less than about 2 GPa, amorphous PLA, semi-crystalline PLA having an elastic modulus of less than about 2 GPa, polyhydroxyalkonates with an elastic modulus greater of less than about 2 GPa, poly(ε-caprolactone), poly(amino acids), poly(phosphazenes), poly(anhydrides), poly(ethylene oxide), polyester amides, and the like, and any combination thereof. Polyanhydrides are another type of particularly suitable degradable polymers useful in the present invention. Examples of suitable polyanhydrides include poly(adipic anhydride), poly(suberic anhydride), poly(sebacic anhydride), poly(dodecanedioic anhydride), and the like, and any combination thereof. Other suitable examples include, but are not limited to, poly(maleic anhydride), poly(benzoic anhydride), and the like, and any combination thereof. Combinations of the foregoing polymers may also be suitable.

In some embodiments, the degradable balls may be substantially homogeneous throughout (e.g., compliant filler materials dispersed in the incompliant degradable polymers or incompliant degradable polymers blended with compliant degradable polymers).

In some embodiments, the degradable balls may be a core-shell structure. It should be noted that a core-shell structure provides for a core and at least one shell with a composition different than that of the core. Suitable core compositions may include, but are not limited to, the incompliant degradable polymers, the incompliant degradable polymers in combination with compliant filler materials, incompliant degradable polymers blended with compliant degradable polymers, and the like. Suitable shell compositions may include, but are not limited to, compliant degradable polymers, the incompliant degradable polymers in combination with compliant filler materials, incompliant degradable polymers blended with compliant degradable polymers, and the like.

In some embodiments, the degradable balls may be a layered structure. It should be noted that a layered structure provides for adjacent layers to be made of different compositions. Suitable layers may include, but are not limited to, the incompliant degradable polymers, the incompliant degradable polymers in combination with compliant filler materials, compliant degradable polymers, incompliant degradable polymers blended with compliant degradable polymers, and the like.

In some instances, the degradable balls described herein may optionally further comprise at least one additive of degradation accelerators, degradable materials, plasticizers, filler materials, and the like, and any combination thereof. Depending on the configuration of the ball, inclusion of any one of the foregoing may be substantially homogeneous throughout the degradable ball, within the core and/or at least one shell of the degradable ball, or within at least one layer of the degradable ball.

The foregoing additives may be useful in tailoring the properties of the degradable balls (e.g., degradation rate, strength, density, and the like). In some embodiments, each of the additives may independently be included in the degradable balls in an amount ranging from a lower limit of about 0.1%, 0.5%, or 1% by weight of the degradable balls to an upper limit of about 10%, 5%, or 2% by weight of the degradable balls, and wherein the amount may range from any lower limit to any upper limit and encompasses any subset therebetween. One skilled in the art with the benefit of this disclosure should recognize that in some instances an additive may be useful at a concentration outside these preferred ranges based on the desired properties of the degradable balls.

As used herein, the term "degradation accelerator" refers to material (e.g., particles or polymers) that accelerate the rate of degradation of the degradable material. For example, degradation accelerators may degrade to form acidic or basic degradation products that, in turn, enhance the rate of degradation of the degradable polymer of the degradable balls. Further, degradation accelerators may be highly soluble in water and dissolve quickly, thereby increasing the surface area or porosity of the degradable polymer of the degradable ball, which increases the degradation rate. Suitable examples of degradation accelerators may include, but are not limited to, salts (e.g., sodium chloride, sodium bromide, ammonium chloride, ammonium bromide, calcium sulfate, and calcium chloride), calcium carbonate, solid anhydrous borate materials, magnesium oxide, calcium oxide, dehydrated compounds, and the like, and any combination thereof.

Suitable dehydrated compounds are those materials that will degrade over time when rehydrated. For example, a particulate solid dehydrated salt or a particulate solid anhydrous borate material that degrades over time may be suitable. Specific examples of particulate solid anhydrous borate materials that may be used include but are not limited to anhydrous sodium tetraborate (also known as anhydrous borax), and anhydrous boric acid. These anhydrous borate materials are only slightly soluble in water. However, with time and heat in a subterranean environment, the anhydrous borate materials react with the surrounding aqueous fluid and are hydrated. The resulting hydrated borate materials are substantially soluble in water as compared to anhydrous borate materials and, as a result degrade in the aqueous fluid.

Blends of certain degradable materials and other compounds may also be suitable. One example of a suitable blend of materials is a mixture of poly(lactic acid) and sodium borate where the mixing of an acid and base could result in a neutral solution where this is desirable. Another example would include a blend of poly(lactic acid) and boric oxide. In choosing the appropriate degradable material or materials, one should consider the degradation products that will result. The degradation products should not adversely affect subterranean operations or components. The choice of degradable material also can depend, at least in part, on the conditions of the well (e.g., wellbore temperature). For instance, lactides have been found to be suitable for lower temperature wells, including those within the range of 60° F. to 150° F. (16° C. to 66° C.), and polylactides have been found to be suitable for wellbore temperatures above this range. Poly(lactic acid) and dehydrated salts may be suitable for higher temperature wells. Also, in some embodiments a preferable result is achieved if the degradable material degrades slowly over time as opposed to instantaneously. In some embodiments, it may be desirable when the degradable material does not substantially degrade until after the degradable material has been substantially placed in a desired location within a subterranean formation.

The carboxylic acids that are suitable for use in the degradable balls described herein include, but are not limited to, such carboxylic acids as: sebacic acid (also known as decanedioic acid, which is believed to have a melting point ("M.P.") of about 133° C. (271° F.) and is insoluble in water at room temperature); stearic acid (also known as octadecanoic acid, which has a M.P. of 156° C. (313° F.), and is a slightly dissolvable fatty acid); phthalic acid (which has a M.P. of 210° C. (410° F.), and is slightly soluble in water at room temperature); isophthalic acid (which has a M.P. of 300° C. (572° F.), and is insoluble in water at room temperature);

adipic acid (which has a M.P. of 152° C. (306° F.) and is slightly soluble in water at room temperature); pamoic acid (which has a M.P. greater than 300° C. (572° F.) and is insoluble in water at room temperature); suberic acid (which has a M.P. of 143° C. (289° F.), and is slightly soluble in water at room temperature); succinic acid (which has a M.P. of 187° C. (369° F.), and is moderately soluble in water at room temperature); traumatic acid (which has a M.P. of 166° C. (331° F.), and is slightly soluble in water at room temperature); thapsic acid (which has a M.P. of 125° C. (257° F.), and is slightly soluble in water at room temperature); and valporic acid (which has a M.P. of 125° C. (257° F.), and is slightly soluble in water at room temperature). The carboxylic acids may also include, as examples: azelaic acid (HOOC—$(CH_2)_7$—COOH, M.P. 107° C. (225° F.), moderately soluble in water); camphoric acid ($C_{10}H_{16}O_4$, M.P. 185° C. (365° F.), moderately soluble in water); campholic acid ($C_{10}H_{18}O_2$, M.P. 95° C. (203° F.), slightly soluble in water); muconic acid ($C_6H_6O_4$, M.P. 290° C. (554° F.), slightly soluble in water); undecanedioic acid ($C_{11}H_{20}O_4$, M.P. 110° C. (230° F.), slightly soluble in water); brassylic acid (M.P. 111° C. (232° F.), slightly soluble in water); melissic acid (M.P. 93° C. (199° F.), slightly soluble in water); p-toluic acid ($CH_3C_6H_4COOH$, M.P. 180° C. (356° F.), slightly soluble in water); sorbic acid ($CH_3CH{=}CHCH{=}CHCOOH$, M.P. 134° C. (273° F.), slightly soluble in water); dodecanedioc acid ($C_{12}H_{22}O_4$, M.P. 128° C. (262° F.), slightly soluble in water); tetradecanedioic acid ($C_{14}H_{26}O_4$, M.P. 127° C. (261° F.), slightly soluble in water); and α-aleuritic acid ($C_{16}H_{32}O_5$, M.P. 97° C. (207° F.), moderately soluble in water). Mixtures of these may be suitable as well. These materials may be used in any mixture or combination.

Suitable fatty alcohols and fatty esters and that may be used in the degradable balls described herein include, but are not limited to, such fatty alcohols and esters as: montanyl alcohol (which has a M.P. of 83° C. (171° F.); tertbutylhydroquinone (which has a M.P. of 128° C. (262° F.), and is insoluble in water); cholesterol (which has a M.P. of 149° C. (300° F.), and has a solubility of 0.095 mg/L of water at 30° C. (86° F.)); cholesteryl nonanoate (which has a M.P. of about 80° C. (176° F.), and is insoluble in water); benzoin (which has a M.P. of about 137° C. (279° F.), and is slightly insoluble in water); borneol (which has a M.P. of about 208° C. (406° F.), and is slightly insoluble in water); exo-norborneol (which has a M.P. of 125° C. (257° F.); glyceraldehyde triphenylmethanol (which has a M.P. of 164.2° C. (324° F.), and is insoluble in water); propyl gallate (which has a M.P. of 150° C. (302° F.)); and dimethyl terephthalate ("DMT") (which has a M.P. of 141° C. (286° F.), and limited solubility in water which is more soluble than "slightly"). If solubilities are not given, then that data is not available. The fatty alcohols may also include, as examples: camphor ($C_{10}H_{16}O$, with a M.P. of about 180° C. (356° F.), slightly soluble in water); cholecalciferol (a.k.a., vitamin D3, $C_{27}H_{44}O$, with a M.P. of about 85° C. (185° F.), slightly soluble in water); ricinoleyl alcohol ($C_{18}H_{36}O_2$, with a M.P. of about 89° C. (192° F.)); 1-Heptacosanol ($C_{27}H_{56}O$, with a M.P. of about 82° C. (180° F.)); 1-Tetratriacontanol (a.k.a. geddyl alcohol $C_{34}H_{70}O$, with a M.P. of about 92° C. (198° F.)); 1-Dotriacontanol (lacceryl alcohol, $C_{32}H_{66}O$, with a M.P. of about 89° C. (192° F.)); 1-Hentriacontanol (melissyl alcohol, $C_{31}H_{64}O$, with a M.P. of about 87° C. (189° F.)); 1-Tricontanol (myricyl alcohol, $C_{30}H_{62}O$, with a M.P. of about 87° C. (189° F.)); 1-Nonacosanol ($C_{29}H_{60}O$, with a M.P. of about 85° C. (185° F.)); 1-Octasanol (a.k.a montanyl alcohol, $C_{28}H_{58}O$, with a M.P. of about 84° C. (183° F.)); 1-Hexacosanol (ceryl alcohol, $C_{26}H_{54}O$, with a M.P. of about 81° C. (178° F.)); 1,14-Tetradecanediol ($C_{14}H_{30}O_2$, with a M.P. of about 85° C. (185° F.)); 1,16-Hexadecanediol, ($C_{16}H_{34}O_2$, with a M.P. of about 91° C. (196° F.)); 1,17-Heptadecanediol, ($C_{18}H_{36}O_2$, with a M.P. of about 96° C. (205° F.)); 1,18-Octadecanediol ($C_{19}H_{38}O_2$, with a M.P. of about 98° C. (208° F.)); 1,19-Nonadecanediol ($C_{20}H_{40}O_2$, with a M.P. of about 101° C. (214° F.)); 1,20-Eicosanediol ($C_{20}H_{42}O_2$, with a M.P. of about 102° C. (216° F.)); 1,21-Heneicosanediol ($C_{21}H_{44}O_2$, with a M.P. of about 105° C. (221° F.)); and 1,22-Docosanediol ($C_{22}H_{46}O_2$, with a M.P. of about 106° C. (223° F.)). Mixtures of these may be suitable as well. These materials may be used in any mixture or combination.

The described esters are generally reaction product of alcohols and acids. Examples include but are not limited to pred-nisolone acetate ($C_{26}H_{36}O_6$, M.P. 233° C. (451° F.), slightly soluble in water), cellobiose tetraacetate (slightly soluble in water), terephthalic acid dimethyl ester, ($C_{10}H_{10}O_4$, M.P. 140° C. (284° F.), slightly soluble in water). Other examples of esters can be found in ester waxes such as Carnauba wax and Ouricouri wax. Carnauba wax contains ceryl palmitate, myricyl ceretate, myricyl alcohol ($C_{30}H_{61}OH$) along with other high molecular weight esters and alcohols. Olho wax is a pure whitish gray carnauba wax obtained from young leaves. Refined olho wax is called flora wax. Palha wax is a brownish wax obtained from older leaves. Palha wax can be emulsified with water to form chalky wax. Castor wax like compound obtained by the controlled hydrogenation of pure castor oil. The principle constituent is glycerol tris 12-hydroxystearate, also known as opalwax with a melting point in the range from about 78° C. (172° F.) to about 85° C. (185° F.).

Prolamins may also be used in the present invention. Prolamins are a group of plant storage proteins having a high proline and glutamine content and found in the seeds of cereal grains. The prolamins that are suitable for use in the degradable balls described herein include, but are not limited to, such prolamins as: gliadin, hordein, secalin, zein and avenin. Prolamins are generally soluble only in strong alcohol solutions and have a melting point in the range from about 160° C. (320° F.) to about 200° C. (392° F.).

The fatty acid salts that are suitable for use in the degradable perforation balls described herein include, but are not limited to, such fatty acid salts as: sucrose distearate, calcium stearate, glyceryl monostearate, zinc stearate and magnesium stearate which is a hydrophobic substance with a melting point of 88° C. (190° F.).

One skilled in the art will recognize that plasticizers may be included in the degradable balls described herein. The plasticizers may be present in an amount sufficient to provide the desired characteristics, for example, increased compatibility of the melt blend components, improved processing characteristics during the blending and processing steps, and control and regulation of the sensitivity and degradation of the polymer by moisture.

In some embodiments, the density of the degradable balls described herein may be tailored with the use of filler materials. Filler materials, in accordance with some embodiments, refers to a broad range of finely powdered materials or fibrous materials that are substantially non-reactive in a downhole, subterranean environment, and typically have a size ranging from a lower limit of about 635 mesh, 600 mesh, 500 mesh, 400 mesh, 350 mesh, 325 mesh, or 250 mesh to an upper limit of about 10 mesh, 50 mesh, 100 mesh, or 200 mesh, and wherein the size may range from any lower limit to any upper limit and encompasses any subset therebetween.

Examples of suitable filler materials include, but are not limited to, natural organic materials, inorganic minerals, silica materials and powders, ceramic materials, metallic materials and powders, synthetic organic materials and powders, mixtures thereof, and the like. Typical examples of such finely graded filler materials suitable for use herein include, but are not limited to, sodium chloride, sugar, silica flour (such as 325 mesh Silica Flour commercially-available from Santrol of Fresno, Tex., USA), calcium carbonate fillers (such as that available in a variety of mesh sizes from Vulcan Minerals Inc. of Newfoundland, Calif., USA), fumed silica (such as that available from PT Hutchins Co., Ltd. of Los Angeles, Calif., USA), and the like and any combination thereof.

Natural organic materials suitable for use as filler materials may include, but are not limited to, finely ground nut shells such as walnut, brazil nut, and macadamia nut, as well as finely ground fruit pits such as peach pits, apricot pits, or olive pits, and any resin impregnated or resin coated version of these.

Silica materials and powders suitable for use as filler materials may include, but are not limited to, glass spheres and glass microspheres, glass beads, glass fibers, silica quartz sand, sintered Bauxite, silica flour, silica fibers, and sands of all types such as white or brown, silicate minerals, and combinations thereof. Typical silica sands suitable for use include Northern White Sands (Fairmount Minerals, Chardon, Ohio), Ottawa, Jordan, Brady, Hickory, Ariz., St. Peter, Wonowoc, and Chalfort. In the case of silica or glass fibers being used, the fibers can be straight, curved, crimped, or spiral shaped, and can be of any grade, such as E-grade, S-grade, and AR-grade. Typical silicate minerals suitable for use herein include the clay minerals of the Kaolinite group (kaolinite, dickite, and nacrite), the Montmorillonite/smectite group (including pyrophyllite, talc, vermiculite, sauconite, saponite, nontronite, and montmorillonite), and the Illite (or clay-mica) group (including muscovite and illite), as well as combinations of such clay minerals.

Ceramic materials suitable for use as filler materials may include, but are not limited to, ceramic beads; ceramic fibers; clay powders; finely crushed spent fluid-cracking catalysts (FCC) such as those described in U.S. Pat. No. 6,372,378; finely crushed ultra-lightweight porous ceramics; finely crushed economy lightweight ceramics; finely crushed lightweight ceramics; finely crushed intermediate strength ceramics.

Metallic materials and powders suitable for use as filler materials may include, but are not limited to, transition metal powders, transition metal dust, and the like.

Synthetic organic materials and powders suitable for use as filler materials may include, but are not limited to, plastic particles, beads or powders, nylon beads, nylon fibers, nylon pellets, nylon powder, SDVB (styrene divinyl benzene) beads, SDVB fibers, TEFLON® fibers, carbon fibers such as PANEX™ carbon fibers from Zoltek Corporation (Van Nuys, Calif.) and KYNOL™ carbon fibers from American Kynol, Inc. (Pleasantville, N.Y.), KYNOL™ novoloid "S-type" fillers, fibers, and yarns from American Kynol Inc. (Pleasantville, N.Y.), and carbon powders/carbon dust (e.g., carbon black).

The properties of the degradable balls described herein should typically be so chosen that the degradable balls have a density ranging from a lower limit of about 0.70 g/cc, 0.75 g/cc, 0.80 g/cc, 0.85 g/cc, 0.90 g/cc, 0.95 g/cc, or 1.0 g/cc to an upper limit of about 1.5 g/cc, 1.4 g/cc, 1.3 g/cc, 1.2 g/cc, 1.1, g/cc or 1.0 g/cc, and wherein the density may range from any lower limit to any upper limit and encompasses any subset therebetween.

In some embodiments, the degradable balls described herein may have a diameter in the range of about 0.625 inches (about 1.58 cm) to about 1.25 inches (about 3.18 cm) with densities ranging from about 0.7 g/cc to 1.5 g/cc. In some embodiments, the degradable balls described herein may have a diameter in the range of about 1 inch (about 2.54 cm) to about 4 inches (about 10.16 cm) with densities ranging from about 0.7 g/cc to 1.5 g/cc. One skilled in the art with the benefit of this disclosure should understand that size and density combinations outside these preferred ranges may be applicable depending on the application.

These degradable balls described herein may, in some embodiments, be useful in subterranean formations for controlling fluid flow between wellbore segments and/or portions of the wellbore and the subterranean formation. Degradable balls then degrade over time, and generally do not require an additional step of retrieving them from the wellbore, thereby returning fluid flow between the sealed segments, portions, or intervals of the wellbore and/or subterranean formation following a prescribed amount of time.

Figure 2:
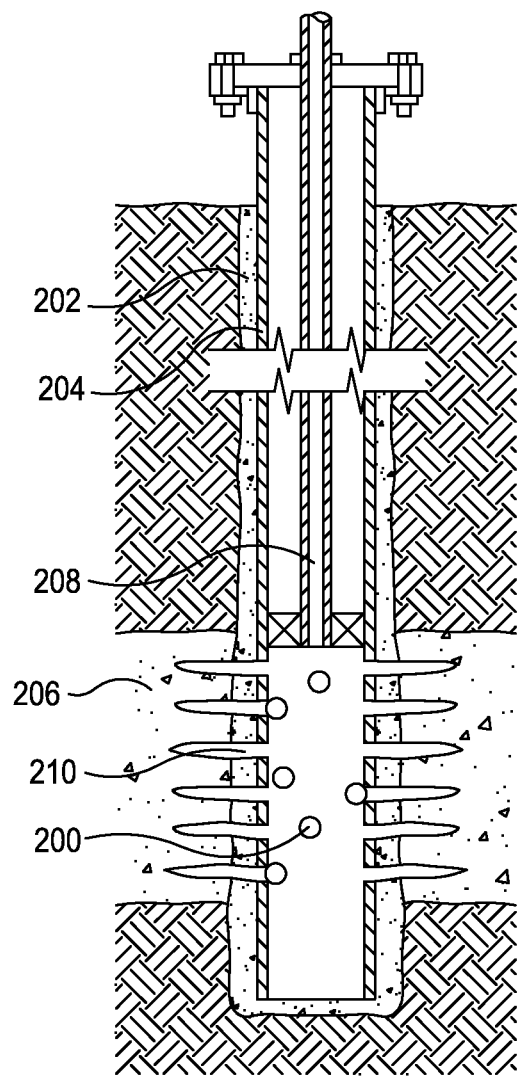
FIG. 2 illustrates the hypothetical flow of examples of certain embodiments of degradable balls described herein in a downhole environment to seal perforations.

When used as a perforation ball, the degradable balls described herein may be useful in fluid diversion in one or more intervals of a subterranean formation having varying permeability and/or injectivity during a stimulation operation. Specifically, the degradable balls described herein become seated in the perforations of the wellbore casing and deflect the treating fluid to unsealed perforations in the wellbore casing. Referring now to FIG. 2, one or more degradable balls 200 described herein may flow through wellbore 202 lined with casing 204 to a zone of interest 206 while being pushed through workstring 208 into the perforations 210.

Some embodiments may involve introducing a plurality of degradable balls described herein into a wellbore penetrating a subterranean formation, wherein the wellbore comprises a plurality of perforations that fluidly connect the wellbore to the subterranean formation; seating the degradable balls in one or more of the perforations, thereby reducing the fluid flow through the one or more perforations and providing a sealed portion of the subterranean formation and a fluidly connected portion of the subterranean formation; treating the fluidly connected portion of the subterranean formation; and degrading the degradable balls, thereby returning fluid connectivity between the wellbore and the sealed portion of the subterranean formation. In some embodiments, treating the fluidly connected portion of the subterranean formation may involve hydraulic fracturing by introducing a treatment fluid at a pressure sufficient to create or extend at least one fracture in the fluidly connected portion of the subterranean formation. In other instances, treating the fluidly connected portion of the subterranean formation may involve matrix acidizing with a treatment fluid comprising a reactive fluid (e.g., HCl, HCl in combination with HF, and the like) at a pressure below that required to create or extend at least one fracture in the fluidly connected portion of the subterranean formation.

Figure 3:
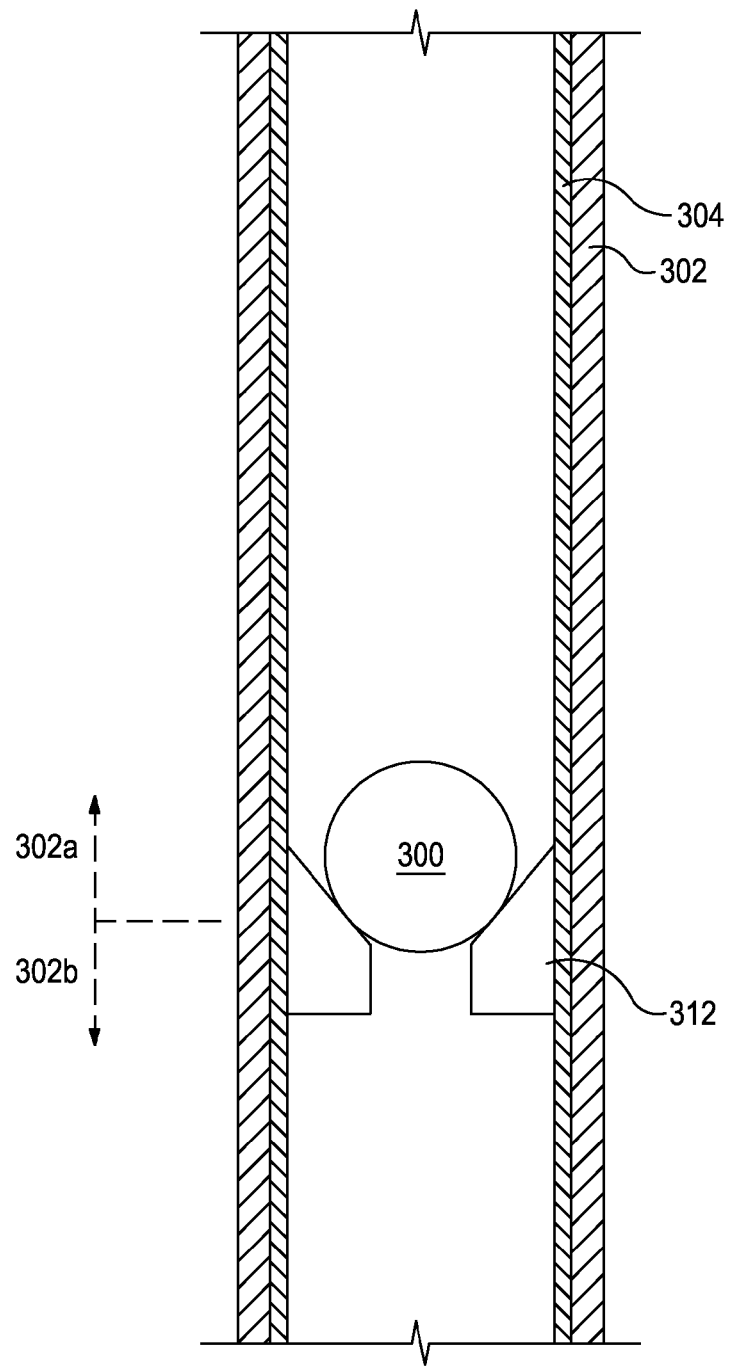
FIG. 3 illustrates a degradable ball described herein seated on a baffle in a downhole environment to seal segments of the wellbore.

In some embodiments, the degradable balls described herein may be useful in a downhole environment to seal off segments of the wellbore. Referring now to FIG. 3, illustrated is degradable ball 300 that may be configured to flow through wellbore 302 lined with casing 304. Degradable ball 300 may be configured to locate and land on baffle 312 defined or otherwise arranged within casing 304. Baffle 312 may serve to generally separate upper and lower portions of wellbore 302, thereby defining upper segment 302a and lower segment 302b of wellbore 302. It should be noted that the terms "upper," "lower," "middle," "intermediate," and the like are used for clarity and should not be considered to be limiting as to the scope of the embodiments described herein.

Some embodiments may involve introducing a degradable ball described herein into a wellbore penetrating a subterranean formation, wherein the wellbore comprises a baffle configured to receive the degradable ball; seating the degradable ball in a baffle arranged within the wellbore, and thereby reducing a fluid flow through the baffle and defining an upper segment of the wellbore and a lower segment of the wellbore; treating the upper segment of the wellbore; and degrading the degradable ball and thereby returning fluid connectivity between the upper segment of the wellbore and the lower segment of the wellbore. In some embodiments, treating the upper segment of the wellbore may involve hydraulic fracturing by introducing a treatment fluid at a pressure sufficient to create or extend at least one fracture in the upper segment of the wellbore. In other instances, treating the upper segment of the wellbore may involve matrix acidizing the upper segment of the wellbore with a treatment fluid comprising a reactive fluid (e.g., an acid like HCl, HCl in combination with HF, and the like) at a pressure below that required to create or extend at least one fracture in the upper segment of the wellbore.

Figure 4:
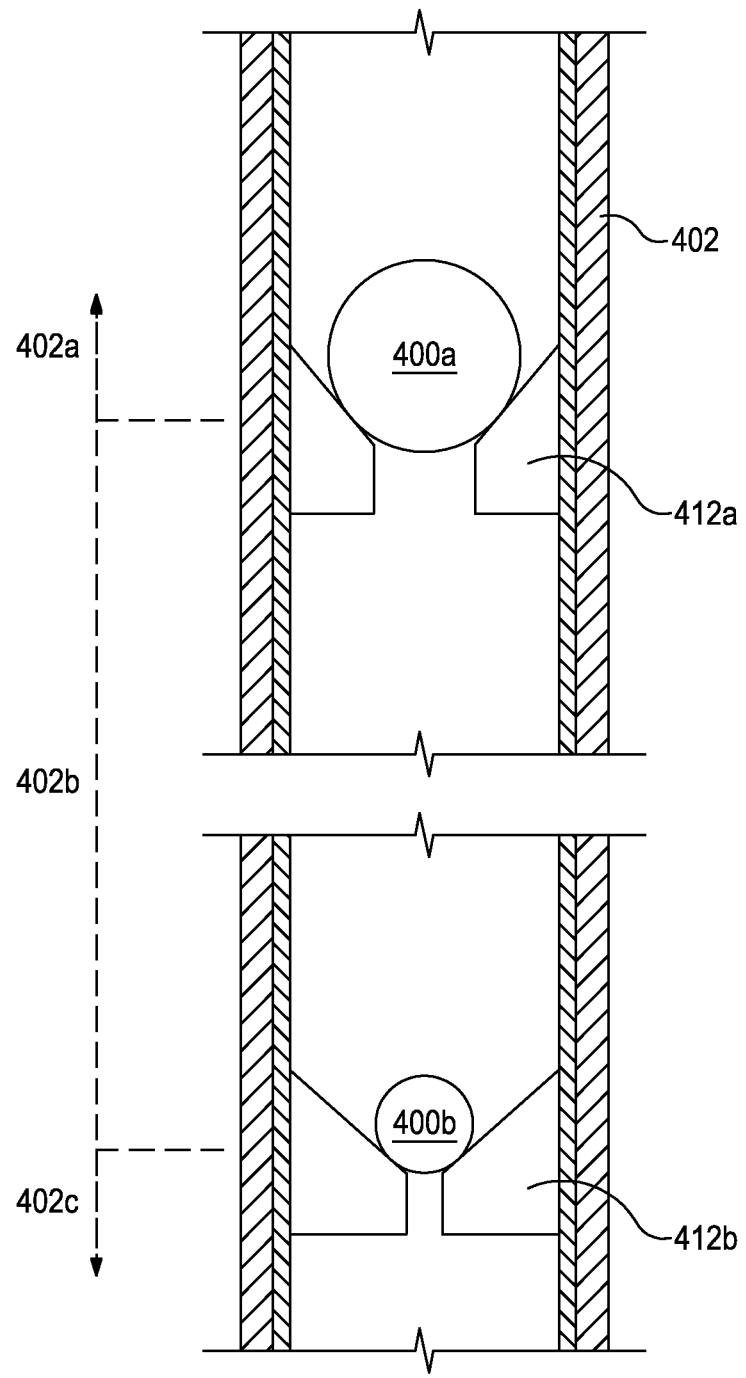
FIG. 4 illustrates two degradable balls described herein seated on baffles in a downhole environment to seal segments of the wellbore.

Referring now to FIG. 4, multiple degradable balls 400a, 400b may be useful in a downhole environment to seal off multiple segments 402a,402b,402c of wellbore 402 when seated in corresponding first and second baffles 412a,412b. In some instances, second degradable ball 400b, which has smaller diameter than first degradable ball 400a and is smaller than the opening in first baffle 412a, may be introduced into the wellbore, pass through first baffle 412a, and become seated in second baffle 412b. At some time after seating second degradable ball 400b, first degradable ball 400a may be introduced into wellbore 402 and become seated in first baffle 412a. As illustrated, the first and second degradable balls 400a,400b seated in the first and second baffles 412a, 412b, respectively, define three axially adjacent segments 402a,402b,402c in wellbore 402.

Some embodiments may involve introducing a first degradable ball into a wellbore penetrating a subterranean formation, the wellbore providing a first baffle and a second baffle arranged uphole from the first baffle, wherein the second baffle is configured to allow the first degradable ball to pass therethrough and locate the first baffle; seating the first degradable ball in the first baffle and thereby reducing a fluid flow through the first baffle; introducing a second degradable ball into the wellbore; seating the second degradable ball in the second baffle and thereby reducing the fluid flow through the second baffle; treating a first wellbore segment defined uphole from the second baffle; degrading the second degradable ball; treating a second wellbore segment defined between the first and second baffles; and degrading the first degradable ball. Some embodiments may further involve treating a third wellbore segment defined downhole from the first baffle.

In some instances, the foregoing method may use the same or different treating methods in relation to the first, second, and third wellbore segments. In some embodiments, treating any of the first, second, and third wellbore segments may involve hydraulic fracturing by introducing a treatment fluid at a pressure sufficient to create or extend at least one fracture in the upper segment of the wellbore. In other instances, treating any of the first, second, and third wellbore segments may involve matrix acidizing the upper segment of the wellbore with a treatment fluid comprising a reactive fluid (e.g., an acid like HCl, HCl in combination with HF, and the like) at a pressure below that required to create or extend at least one fracture in the upper segment of the wellbore.

Figure 5A:
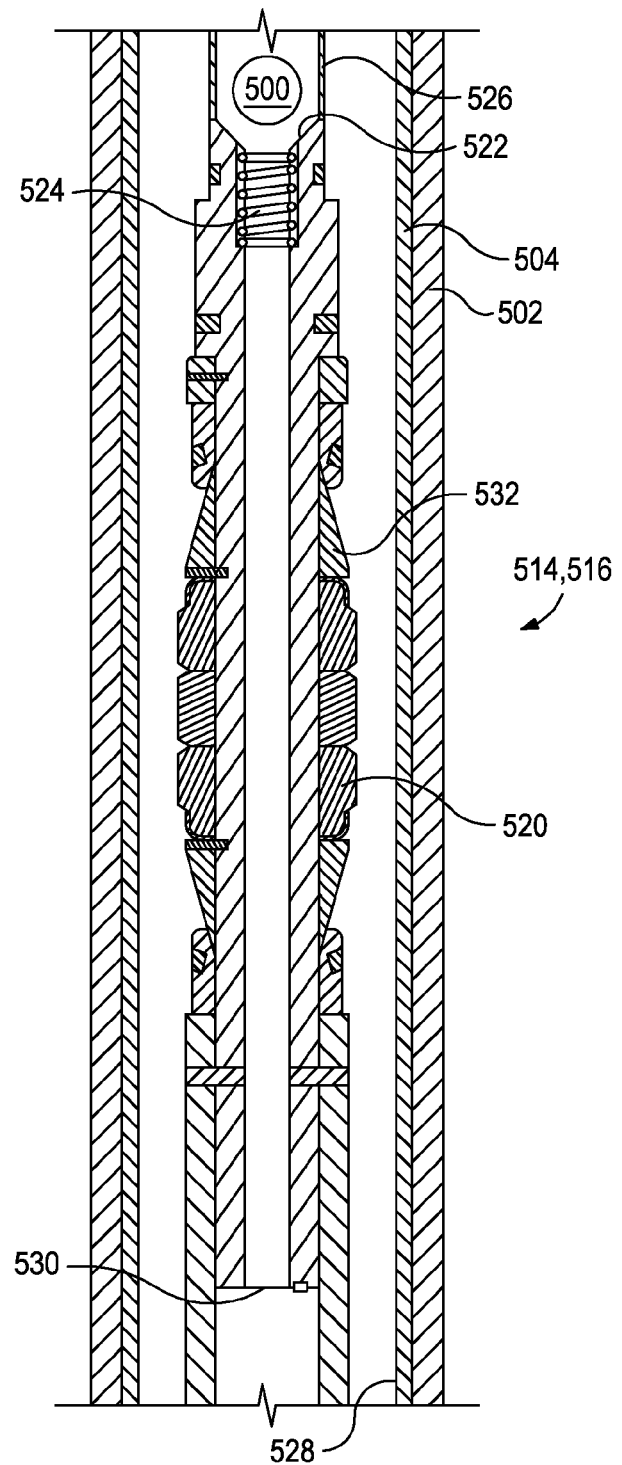
FIG. 5A illustrates a degradable ball described herein prior to seating on a wellbore tool.
Figure 5B:
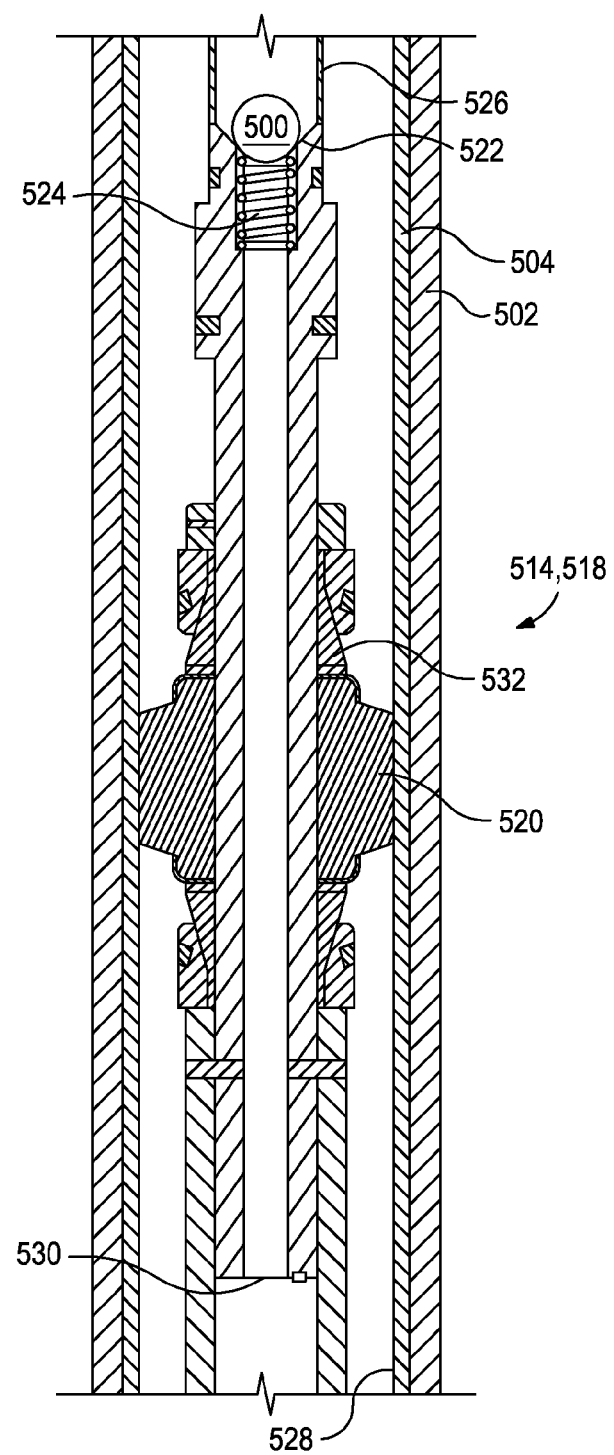
FIG. 5B illustrates a degradable ball described herein seated on and having actuated a wellbore tool.

Referring now to FIGS. 5A and 5B, illustrated is expandable packer assembly 514. Assembly 514 may be extended into wellbore 502 on conveyance 526. As illustrated, wellbore 502 may be lined with casing 504 or the like. Assembly 514 may include one or more packing elements 520 configured to expand and contact inner wall 528 of casing 504 upon proper actuation. In FIG. 5A, assembly 514 is depicted in its run-in configuration 516. FIG. 5B, on the other hand, depicts assembly 514 in its actuated configuration 518, or otherwise after packing elements 520 have been expanded.

In order to expand packing elements 520, degradable ball 500, such as one of those described herein, may be introduced into conveyance 526 and conveyed to assembly 514. At assembly 514, degradable ball 500 may be configured to locate and be seated within seat 522. Biasing device 524 (e.g., a spring) may be configured to bias degradable ball 500 in the uphole direction. Upon pressurizing conveyance 526, however, the hydraulic pressure within conveyance 526 overcomes the force of biasing device 524 and forces degradable ball 500 against seat 522, thereby substantially sealing conduit 530 extending below seat 522. Increasing the pressure in the conveyance 526 may serve to force degradable ball 500 even harder against seat 522, which serves to axially compress corresponding wedges 532 on either side of packing elements 520. As depicted in FIG. 5B, compressing wedges 532 serves to also compress packing elements 520, thereby forcing packing elements 520 to expand radially outward and into contact with inner wall 528 of the casing 504.

Some embodiments may involve introducing a degradable ball according to embodiments described herein into a wellbore penetrating a subterranean formation, wherein the wellbore comprises a wellbore tool (e.g., a packer, a sliding sleeve, a perforated sliding sleeve, a collet assembly, a crossover tool, and the like, wherein the wellbore tool is configured to receive the degradable ball; seating the degradable ball in the wellbore tool, thereby reducing the fluid flow through at least a portion of the wellbore tool; applying a differential pressure across the degradable ball seated on the wellbore tool, so as to actuate the wellbore tool; and degrading the degradable ball. One skilled in the art, with the benefit of this disclosure, would understand the variety of actuating mechanisms suitable for individual wellbore tools. For example, actuating a packer may involve engaging packer elements of the packer with the casing of the wellbore, as described above. In another example, actuating a sliding sleeve may involve axially moving the sliding sleeve within the wellbore. In another example relating to a crossover tool typically used in gravel packing operations, actuating the crossover tool may involve opening or closing at least one flow path across the crossover tool (e.g., a flow path that extends from the internal flow path of the crossover tool string into the annulus area to be packed in a gravel packing operation).

The degradable balls described herein may be degradable by aqueous based fluids under acidic, neutral, or basic pH environments, depending on the chemical composition of the degradable balls. By "acidic pH", it is meant that the environment surrounding the degradable balls (e.g., the treating fluid) has a pH less than about 7, while by "neutral pH" it is meant that the environment surrounding the degradable balls has a pH of about 7, and "basic pH" means a pH of above about 7. Accordingly, in the methods described herein, degrading a degradable ball may involve contacting the degradable ball with a degrading fluid (e.g., an appropriately acidic, neutral, or basic aqueous fluid).

In some instances, the degradable balls may degrade in the wellbore and/or subterranean formation without the need for introduction of an additional fluid (e.g., as a result of temperature, exposure to fluids from the formation, a previous treatment, or used in introducing the degradable ball). Accordingly, in the methods described herein, degrading a degradable ball may involve allowing the degradable ball to degrade. As described above, the degradation rate of the degradable ball can be tailored or otherwise varied based on the compositions and configuration/structure of the degradable ball.

The degradable balls described herein can be manufactured using a number of processes, including melting and molding, hot press and the like. Solvent-based techniques may be suitable as well. Such processes allow the degradable balls described herein to have any number of desired three-dimensional geometric shapes, including polygonal, spherical, or more complex shapes like darts and wipers. In some instances, the degradable balls described herein may preferably be substantially spherical in shape. However, it will be apparent to those of skill in the art that any of the commonly used shapes for use in oil field tubular pipes can be used in accordance with the present invention.

Further, and in accordance herein, the various components of the degradable balls (e.g., incompliant degradable polymers, compliant filler materials, compliant degradable polymers, degradation accelerators, degradable materials, plasticizers, filler materials, and the like) can be added before injection molding (e.g., mixed before heating or compounded as a polymer melt). In some instances, the process of the invention is practiced in a conventional injection molding machine. The mixture in particulate form is tumble blended with the master-batch until homogeneous. The blend is charged to the hopper of an injection molding machine which melts the resin under heat and pressure, thereby converting it to a flowable thermoplastic mass. In some instances, for example, for the production of complex structures like core-shell or layered degradable balls, two or more blends may be produced for each of the portions of the degradable ball.

The nozzle of the injection molding machine is in liquid flow communication with a mold whose mold cavity or cavities is of substantially the same dimension as the final core. The molds are water cooled to a temperature of about 0° C. (32° F.) to about 18° C. (65° F.) and preferably to a temperature of about 2° C. (35° F.) to about 7° C. (45° F.) which is necessary to form a skin on the surface of the polymeric mass injected into the mold. Upon injection of the required amount of polymeric mixture in optional combination with one or more filler materials into the mold cavity, the mold is continuously cooled with water in order to maintain the mold cavity surface at the low temperature. The thermoplastic mass is held in the mold until a spherical mass of adequate strength is formed so that upon removal of the spherical mass from the mold, the mass does not collapse. Upon removal of the mass from the mold, the sprue is cut with a small excess above the surface of the sphere to allow for shrinkage, and the formed ball core is placed in a water immersion bath at about 0° C. (32° F.) to about 18° C. (65° F.), and more preferably, at about 2° C. (35° F.) to about 7° C. (45° F.), for a period of time to substantially quench the ball. The minimum period of quenching time in the water bath is about 15 minutes. If the ball is not sufficiently cooled in the water bath, it does not shrink and an oversized product is obtained. After removal from the water bath, the balls are placed on a rack at ambient temperature.

The degradable balls described herein may be formed from the above process to have dimensions substantially the same as the mold cavity, and such cores can be produced within tolerances of plus or minus 0.1% deviation in circumference and plus or minus 0.6% deviation in weight. The ball is typically characterized by a substantially smooth surface and a substantially spherical shape, although other polygonal shapes can be used.

Embodiments disclosed herein include:
A. a degradable ball for downhole use, the degradable ball including an incompliant degradable polymer and a compliant filler material, the incompliant degradable polymer having an elastic modulus of about 2 GPa or greater, and the compliant filler material having an elastic modulus of less than about 2 GPa; and
B. a degradable ball for downhole use, the degradable ball including a core and at least one shell disposed about the core, wherein the core includes a first incompliant degradable polymer having an elastic modulus of about 2 GPa or greater; and wherein the shell includes at least one selected from the group consisting of a degradable compliant polymer; a second incompliant degradable polymer and a compliant filler; a second incompliant degradable polymer and a degradable compliant polymer; and any combination thereof, the compliant filler material and the degradable compliant polymer each having an elastic modulus of less than about 2 GPa, and the second and third incompliant degradable polymers each having an elastic modulus of about 2 GPa or greater.

Each of embodiments A and B may have one or more of the following additional elements in any combination: Element 1: any one of the incompliant degradable polymers comprising at least one selected from the group consisting of poly (glycolic acid), crystalline poly(lactic acid), semi-crystalline poly(lactic acid), a polyhydroxyalkonate, poly(hydroxybutyrate), an aliphatic polyester, a polycarbonate, an aliphatic polycarbonate, a polyorthoester, polyethylene terephthalate, a copolymer thereof, and a blend thereof; Element 2: any one of the compliant filler materials comprising at least one selected from the group consisting of a vulcanized rubber particle, a rubber fiber, a thermoplastic particle, a thermoplastic fiber, a hollow glass sphere, a hollow ceramic sphere, a hollow metal sphere, a hollow thermoplastic sphere, a particulate of a compliant degradable polymer, and any combination thereof; Element 3: any one of the compliant filler materials comprising at least one selected from the group consisting of, a polysaccharide (e.g., dextran or cellulose), chitin, chitosan, a protein, an aliphatic polyester, amorphous poly(lactic acid), semi-crystalline poly(lactic acid), a polyhydroxyalkonate, poly($\epsilon$-caprolactone), a poly(amino acid), a poly(phosphazene), a poly(anhydride), poly(ethylene oxide), a polyester amide, a copolymer thereof, and a blend thereof; Element 4: any one of the compliant filler materials comprising a plurality of particulates having an average diameter of about 50 nm to about 500 nm; Element 5: any one of the compliant filler materials comprising a plurality of particulates having an average diameter of about 0.5 microns to about 1 mm; Element 6: any one of the compliant filler materials comprising a plurality of particulates having a surface modification; Element 7: any one of the compliant filler materials being present in an amount of about 0.5% to about 50% by weight of the degradable ball; Element 8: the degradable ball further comprising at least one selected from the group consisting of a degradation accelerator, a degradable material, a plasticizer, a filler material, and any combination thereof; Element 9: the degradable ball having a structure selected from the group consisting of a layered structure, a core-shell structure, and a hybrid thereof, unless otherwise provided for; Element 10: the degradable ball having a diameter of about 1 inch to about 4 inches.

By way of non-limiting example, exemplary combinations applicable to A and B include: Elements 1 and 2; Elements 1 and 3; Elements 1, 2, and 3; any of the foregoing in combination with Element 4 or Element 5; Element 6 in combination with at least one of Elements 2, 4, or 5; Element 1 in combination with the foregoing; at least one of Elements 7-10 in combination with at least one of the foregoing; at least two of Elements 7-10 in combination, and so on.

Additional embodiments disclosed herein include methods that involve:

C. introducing a degradable ball according to Embodiment A or B (with any combination of the optional elements as described herein) into a wellbore penetrating a subterranean formation; seating the degradable ball in a baffle arranged within the wellbore, and thereby reducing a fluid flow through the baffle and defining an upper segment of the wellbore and a lower segment of the wellbore; treating the upper segment of the wellbore; and degrading the degradable ball and thereby returning fluid connectivity between the upper segment of the wellbore and the lower segment of the wellbore; and D. introducing a degradable ball according to Embodiment A or B (with any combination of the optional elements as described herein) into a wellbore penetrating a subterranean formation and having a wellbore tool arranged therein, wherein the wellbore tool is configured to receive the degradable ball; seating the degradable ball on the wellbore tool and thereby reducing the fluid flow through at least a portion of the wellbore tool; applying a differential pressure across the degradable ball seated on the wellbore tool and thereby actuating the wellbore tool; and degrading the degradable ball.

Embodiment C may have the following additional elements: Element 11: wherein treating the upper segment of the wellbore comprises introducing a treatment fluid at a pressure sufficient to create or extend at least one fracture in the subterranean formation adjacent the upper segment of the wellbore; and Element 12: wherein treating the upper segment of the wellbore comprises matrix acidizing the upper segment of the wellbore with a treatment fluid comprising a reactive fluid at a pressure below that required to create or extend at least one fracture in the subterranean formation adjacent the upper segment of the wellbore.

Embodiment D may have the following additional elements: Element 13: wherein the wellbore tool is a packer assembly and actuating the wellbore tool comprises engaging one or more packer elements of the packer assembly with an inner wall of the wellbore; Element 14: wherein the wellbore tool is a sliding sleeve and actuating the wellbore tool comprises axially moving the sliding sleeve within the wellbore; and Element 15: wherein the wellbore tool is a crossover tool and actuating the wellbore tool comprises opening or closing at least one flow path across the crossover tool.

To facilitate a better understanding described herein, the following examples of preferred or representative embodiments are given. In no way should the following examples be read to limit, or to define, the scope of the invention.

EXAMPLES

In one example, sebacic powder is melted and molded into a 0.875 inches (about 2.22 cm) diameter ball. FIG. 1 relates to the dissolution of a 7/8 inches (about 2.22 cm) ball made of sebacic acid. The ball weighs 6.47 grams and sank in water. The ball remains hard up to 200° F. (93° C.). The ball dissolves in hot water in the temperature range of about 180° F. to 210° F. (82° C. to 99° C.) with the dissolution rate increasing with temperature. In 200° F. (93° C.) water, the ball's diameter decreases to 0.8 inches (about 2.03 cm) in 0.5 hours and 0.5 inches (about 1.27 cm) in about 2 hours. The dissolution rate at 180° F. (82° C.) is considerably slower, with little diameter change in 1 hour. It is believed that such a degradable perforation ball would be useful in subterranean applications involving about 75° F. to about 550° F. (24° C. to 288° C.).

In another example, suberic acid and adipic acid made from melting their respective powders will dissolve in about 2 to about 3 hours at 175° F. (79° C.) while maintaining mechanical strength.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the embodiments described herein. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usage of a word or term in this specification and one or more patent or other documents that may be incorporated herein by reference, the definitions that are consistent with this specification should be adopted.

The invention claimed is:

1. A method comprising:
   introducing a degradable ball into a wellbore penetrating a subterranean formation, wherein the degradable ball comprises an incompliant degradable polymer and a compliant filler material, the incompliant degradable polymer having an elastic modulus of about 2 GPa or greater, and the compliant filler material having an elastic modulus of less than about 2 GPa;
   seating the degradable ball in a baffle arranged within the wellbore, and thereby reducing a fluid flow through the baffle and defining an upper segment of the wellbore and a lower segment of the wellbore;
   treating the upper segment of the wellbore; and
   degrading the degradable ball and thereby returning fluid connectivity between the upper segment of the wellbore and the lower segment of the wellbore.

2. The method of claim 1, wherein treating the upper segment of the wellbore comprises introducing a treatment fluid at a pressure sufficient to create or extend at least one fracture in the subterranean formation adjacent to the upper segment of the wellbore.

3. The method of claim 1, wherein treating the upper segment of the wellbore comprises matrix acidizing the upper segment of the wellbore with a treatment fluid comprising a reactive fluid at a pressure below that required to create or extend at least one fracture in the subterranean formation adjacent to the upper segment of the wellbore.

4. The method of claim 1, wherein the compliant filler material comprises at least one selected from the group consisting of a vulcanized rubber particle, a rubber fiber, a thermoplastic particle, a thermoplastic fiber, a hollow glass sphere, a hollow ceramic sphere, a hollow metal sphere, a hollow thermoplastic sphere, a particulate of a compliant degradable polymer, and any combination thereof.

5. The method of claim 1, wherein the compliant filler material comprises a plurality of particulates having an average diameter of about 50 nm to about 500 nm.

6. The method of claim 1, wherein the compliant filler material comprises a plurality of particulates having an average diameter of about 0.5 microns to about 1 mm.

7. The method of claim 1, wherein the compliant filler material comprises a plurality of particulates having a surface modification.

8. The method of claim 1, wherein the compliant filler is present in an amount of about 0.5% to about 50% by weight of the degradable ball.

9. The method of claim 1, wherein the degradable ball further comprises at least one selected from the group consisting of a degradation accelerator, a degradable material, a plasticizer, a filler material, and any combination thereof.

10. The method of claim 1, wherein the degradable ball has a structure selected from the group consisting of a layered structure, a core-shell structure, and a hybrid thereof.

11. The method of claim 1, wherein the degradable ball has a diameter of about 1 inch to about 4 inches.

12. A method comprising:
introducing a degradable ball into a wellbore penetrating a subterranean formation and having a wellbore tool arranged therein, wherein the wellbore tool is configured to receive the degradable ball, wherein the degradable ball comprises an incompliant degradable polymer and a compliant filler material, the incompliant degradable polymer having an elastic modulus of about 2 GPa or greater, and the compliant filler material having an elastic modulus of less than about 2 GPa;
seating the degradable ball on the wellbore tool and thereby reducing the fluid flow through at least a portion of the wellbore tool;
applying a differential pressure across the degradable ball seated on the wellbore tool and thereby actuating the wellbore tool; and
degrading the degradable ball.

13. The method of claim 12, wherein the wellbore tool is a packer assembly and actuating the wellbore tool comprises engaging one or more packer elements of the packer assembly with an inner wall of the wellbore.

14. The method of claim 12, wherein the wellbore tool is a sliding sleeve and actuating the wellbore tool comprises axially moving the sliding sleeve within the wellbore.

15. The method of claim 12, wherein the wellbore tool is a crossover tool and actuating the wellbore tool comprises opening or closing at least one flow path across the crossover tool.

16. The method of claim 1, wherein the incompliant degradable polymer comprises at least one selected from the group consisting of poly(glycolic acid), crystalline poly(lactic acid), semi-crystalline poly(lactic acid), a polyhydroxyalkonate, poly(hydroxybutyrate), an aliphatic polyester, a polycarbonate, an aliphatic polycarbonate, a polyorthoester, polyethylene terephthalate, a copolymer thereof, and a blend thereof.

\* \* \* \* \*